UNITED STATES PATENT OFFICE.

EMIL FISCHER, OF BERLIN, GERMANY, ASSIGNOR TO C. F. BOEHRINGER & SOEHNE, OF WALDHOF, GERMANY.

PROCESS OF MAKING PURINS.

SPECIFICATION forming part of Letters Patent No. 598,502, dated February 8, 1898.

Application filed June 14, 1897. Serial No. 640,763. (Specimens.)

*To all whom it may concern:*

Be it known that I, EMIL FISCHER, a citizen of the Empire of Germany, residing at Berlin, in the Empire of Germany, have invented certain new and useful Improvements in the Art of Preparing Purins; and I do hereby declare the following to be a full, clear, and exact description of the invention, such as will enable others skilled in the art to which it appertains to make and use the same.

This invention relates to the art of preparing purin, and in particular that class of purins which have been first obtained by Lorenz and Fritz Ach and which have been described in an application filed by them June 14, 1897, Serial No. 640,762—namely, methyl-free purins.

For a full explanation of the term "purin" reference is made to an article in *Berichte der Deutschen Chemischen Gesellschaft*, Vol. 30, page 549, and also to *Abstracts of the British Chemical Society*, Vol. 46, 1884, page 996, et seq.

In the aforesaid application is described a process of converting uric acid into dichloro-oxypurin by acting on the same by means of phosphorus oxychlorid by eliminating the two oxygen atoms in the alloxan ring or group. The structural formula of the purin described in said application, which is the (2.6) dichloro₈ oxypurin, is

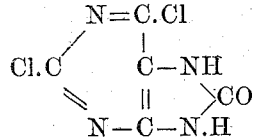

I have found that the remaining oxygen atom may be replaced by chlorin through the further action of phosphorus oxychlorid. I thus obtain trichloropurin, whose structural formula is

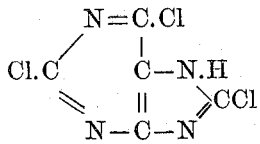

The present invention consists in my newly-discovered method of preparing this compound, in the compound itself, and in such further steps, methods, and features as will be described below and pointed out in the claims.

I find that the new body may be obtained and isolated best by employing pure dichloro-oxypurin as the material to start from.

The following is a detailed description of what I consider the best manner of carrying out my invention, the proportions being all given by weight.

One part of finely-powdered (2.6) dichloro₈ oxypurin is heated in a closed vessel with seventy parts of phosphorus oxychlorid to from 150° to 155° centigrade and maintained at this temperature for four hours, the mixture being agitated as much as possible. At the close of the reaction a clear solution having a pale-yellow color is formed. This solution is evaporated *in vacuo* to completely remove all traces of the phosphorus oxychlorid. The amorphous residue is then made crystalline by shaking the same with cold water. The colorless crystalline product so obtained is then filtered and washed with cold water.

For the purpose of completely purifying the crude trichloropurin obtained by this method five times its quantity of ether is added to dissolve it, whereby a portion of the impurities remains. The residue which remains after removing the ether is then boiled with sixty times its weight of water. In this boiling stage a foreign substance which was mixed with the trichloropurin is eliminated and remains as a solid residue when the liquid has been filtered off or otherwise separated. On cooling of the aqueous solution the trichloropurin is obtained in the form of fine colorless scales. The non-hygroscopic compound thus obtained has the formula $C_5HN_4Cl_3 + 5H_2O$ or

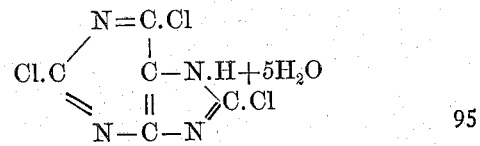

The water of cystallization is completely driven off at a temperature of about 110° centigrade. On heating the dried substance rapidly it begins to trickle and melts at from 184° to 188° centigrade, the melting being attended by frothing.

The dehydrated compound dissolves in about seventy parts of boiling water and is readily soluble in warm alcohol, ether, acetone, and chloroform. With equal readiness it is dissolved in dilute alkalies. By mineral acids it is thrown out of solution.

Trichloropurin is readily soluble in warm dilute ammonia. After cooling of the ammoniacal solution thus obtained the ammonia salt separates in the form of elongated needles, the largest portion of which unites in the form of spherical or spheroidal conglomerates.

What I claim, and desire to secure by Letters Patent, is—

1. The process which consists in treating a dihalogen oxypurin with a phosphorus halogen compound.

2. The process which consists in treating dichloroxypurin with a phosphorus oxyhalogen compound.

3. The process which consists in heating dichloroxypurin together with phosphorus oxychlorid in the proportions substantially as stated and agitating the mixture while heating.

4. The process which consists in heating dichloroxypurin together with phosphorus oxychlorid in the proportions substantially as stated and agitating the mixture while heating, and then evaporating the resulting solution in vacuo to remove the residual phosphorus oxychlorid.

5. The process which consists in heating dichloroxypurin together with phosphorus oxychlorid in the proportions substantially as stated and agitating the mixture while heating, and then evaporating the resulting solution in vacuo to remove the residual phosphorus oxychlorid, then shaking the amorphous residue with cold water to crystallize the same.

6. The process of completely purifying the crude trichloropurin which consists in adding ether to the same to dissolve it and separate it from a part of the impurities, removing the ether and then boiling the residue in water, all in the proportions substantially as specified whereby all of the remaining impurities are thrown out as a solid residue.

7. As a new compound trichloropurin having the formula hereinbefore given, which crystallizes in fine colorless scales, whose water of crystallization is driven off at about 110°, centigrade, and which melts at about from 184° to 188°, centigrade, which, when dehydrated, dissolves in about seventy parts of boiling water, is readily soluble in warm alcohol, ether, acetone and chloroform, and dilute alkalies, but is thrown out of solution by mineral acids.

In testimony whereof I affix my signature in presence of two witnesses.

EMIL FISCHER.

Witnesses:
W. HAUPT,
HENRY HASPER.